TWO-PHASE COMPUTER SYSTEMS

Filed April 12, 1963 4 Sheets-Sheet 1

John W. Cannon
INVENTOR.
BY Michael P. Breston
ATTORNEY

John W. Cannon
INVENTOR.

BY Michael P. Breston

ATTORNEY

John W. Cannon
INVENTOR.
BY Michael P. Breston
ATTORNEY

John W. Cannon
INVENTOR

BY Michael P. Breston

ATTORNEY

United States Patent Office 3,299,285

Patented Jan. 17, 1967

3,299,285

TWO-PHASE COMPUTER SYSTEMS

John W. Cannon, Los Angeles, Calif., assignor, by mesne assignments, to Control Data Corporation, Minneapolis, Minn, a corporation of Minnesota Filed Apr. 12, 1963, Ser. No. 272,611
10 Claims. (Cl. 307—88.5)

This invention relates to high-speed digital computers wherein synchronizing clock signals are employed for controlling the conditions of the computers' logic elements or bistable devices.

The demand for faster digital computers is steadily growing. To achieve such computers, however, the designer must first overcome a well-recognized obstacle known in the art as the "logic race" condition or problem. As is well known, the buildings blocks of digital computers are typically bistable devices, hereinafter termed flip-flops (F-F). Considering a single bistable device within a computer, it may assume either a "set" or a "reset" condition depending upon set or reset orders or signals from a logic network driven by signals provided by one or more bistable devices preceding and/or following and/or including the single device in the logic structure. The preceding and/or following bistable devices, however, are also responsive to the output signals (orders or decisions) of said single device. It is this interdependency which may result in the logic race condition.

To illustrate, assume that, through a logic network, a single flip-flop is ordered by the preceding flip-flops to "set" upon the arrival of the next clock pulse which shall be called the first clock pulse. The computer logic, however, is so arranged that the set condition assumed by the single flip-flop will cause a complementary order, i.e., a reset order, to become applied to said single flip-flop. When the first clock pulse arrives, the flip-flop changes to its set condition as directed resulting in a set decision which is propagated through the other logic elements causing a reset order to be applied to the flip-flop. The latter order will be executed by the flip-flop only in the presence of a clock signal. If this reset order arrives while the first clock signal is still present, then the situation may arise that the flip-flop will set and reset during one clock period or cycle in response to one set order even though it is intended that the flip-flop reset only during the second clock period.

At least two undesirable effects are directly attributable to the logic race condition. First, the directive order into a flip-flop may disappear at some arbitrary time after the start of a clock signal as a result of the rapid switching of a given flip-flop whose output has formed the directive order. Should the directive signal have, as a result, less than the minimum required duration, then the directed flip-flop may not receive sufficient energy to cause it to switch states. Second, because a given flip-flop may change states quite rapidly in a single clock period in response to one set order, the preceding and following flip-flops may receive directive orders based on the changed (new) state of the given flip-flop rather than on the original state as was intended.

Several methods may be employed to obviate the logic race problem. The most frequently used technique uses time delay networks so that a minimum time must elapse between the set and reset orders applied to the flip-flop. The time delay is such as to assure that the reset order arrives at or after the termination of the first clock signal.

The reliance upon a specific time delay, whether obtained by intentionally inserted delay networks or by inherent circuit delays, is not, however, without disadvantage. The delay characteristics of delay networks or circuits vary considerably as a function of component aging and of environmental operating conditions, such as temperature, humidity, voltage levels, types of performed decisions (duty cycle), etc. Consequently, it is rather difficult, if not impossible, to reach reliable estimates of the shortest delay time required to obviate the logic race problem. Additionally, it will be apparent that when time delays are employed, the inherent speed capabilities of the computer cannot be utilized to their fullest extent. Another notable difficulty is that delay networks consume power which may not be available from the logic elements without the use of additional power amplifiers.

Another method which may be used to obviate the logic race problem consists in using, instead of a single-flip flop as the basic logic element, double or "two-phase" flip-flops. It was generally believed that when two-phase flip-flops are employed, to synchronize them it is necessary to use two clock signals having the same rate but being displaced by a predetermined time interval. The main disadvantage of computers using the two-clock, two-phase flip-flop systems is that the computers become too costly. As will be apparent to a man skilled in the art, the provision of two clock sources and the channeling of the clock signals to the logic elements pose serious problems. Moreover, a great number of components are required to make gating networks and power amplifiers for use in conjunction with the flip-flop elements.

Accordingly, it is an object of the present invention to provide very fast digital computers free of the logic race problem and of the drawbacks of the prior art.

It is another object of this invention to provide in fast digital computers logic elements including two-phase flip-flops controllable only by a single clock signal source.

It is a further object of this invention to provide such digital computers with two-phase flip-flops wherein the flip-flops are used both as storing and as power amplifying devices.

It is still a further object of this invention to provide fast digital computers employing two-phase flip-flops which are synchronized by a directly coupled single clock source.

The novel features which are believed to be characteristic of the invention are set forth with particularity in the appended claims. The invention itself, however, both as to its organization and method of operation, together with further objects and advantages thereof, may best be understood by reference to the following description, taken in conjunction with the accompanying drawings in which:

The above and other apparent objects of this invention are accomplished by providing in a digital computer logic blocks comprising at least a first bistable device and a second bistable device, unidirectionally conducting elements coupling the output signals of said first device to the inputs of said second device, said output signals of said first bistable device being compared relative to a fixed reference level, unidirectionally conducting devices coupling directive signals to said first bistable device, said first bistable device having a reference level which is made to alternate about said fixed level whereby said first device becomes responsive to one of said directive signals only when said reference level of said first device falls below the reference level of said second device, and said second device becomes responsive to one of said output signals of said first bistable device only when the reference level of said first bistable device exceeds said fixed reference level.

Figure 1:
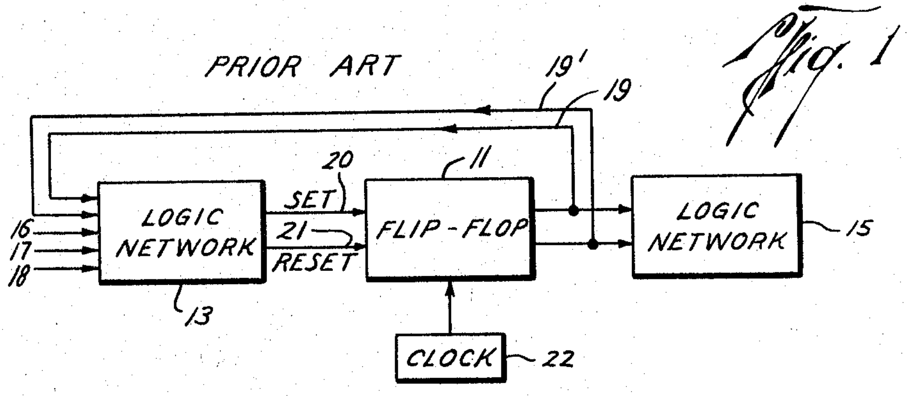
FIG. 1 shows a prior art digital computer employing a single bistable device synchronized with a single clock signal.

Referring to FIG. 1 which serves to illustrate how a logical race condition may arise in a prior art digital computer, it is helpful to consider as the basic element a flip-flop (F-F), generally designated as 11. A computer installation typically has hundreds and often thousands of such flip-flops. Each may be preceded by other flip-flops and other circuits, all represented as forming a logic network 13. In a similar manner, F-F 11 may be followed by a complex logic network 15. Logic network 13 is responsive to decisions arriving on a plurality of lines only three of which 16–18 are shown. Logic network 13 is also responsive to the decisions of F-F 11 arriving on lines 19, 19′. Flip-flop 11 receives directive signals ("orders") such as "set" and "reset" signals from network 13 via lines 20 and 21.

Figure 2:
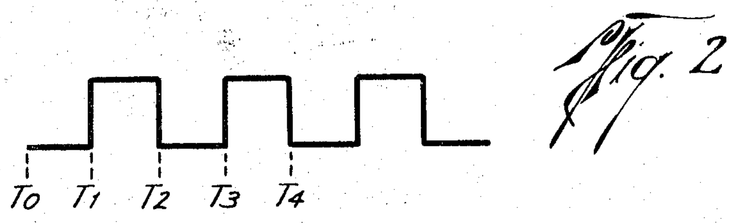
FIG. 2 shows a typical clock signal wave form applied to the system of FIG. 1.

The logic race problem will become more apparent if it is assumed that the logic network 13 is so arranged that when a set order arrives on line 20, the next order will be a reset order on line 21. Flip-flop 11, however, can respond to the received orders only during the presence of clock signals shaped, for example, as shown in FIG. 2. These clock signals are applied to F-F 11 by a clock source 22.

Considering positive logic, flip-flop 11 may be ordered to set by a directive signal on line 20. If flip-flop 11 does set, i.e., stores a logical ONE, then the presence of the stored logical ONE in flip-flop 11 will be indicated by a ONE signal on the output line 19 (the ONE signal may be a predetermined positive voltage). Inversely, flip-flop 11 may be ordered to reset by a directive signal on line 21. If flip-flop 11 does reset, i.e., stores a logical ZERO, then the presence of the stored logical ZERO in flip-flop 11 will be indicated by a ONE signal on the output line 19′.

Assume that at time $T_0$ (FIG. 2), line 20 receives a set order. Then shortly after receiving a clock signal at time $T_1$, F-F 11 sets and provides a ONE signal via line 19 to the logic network 13 which, in turn, provides a reset order to line 21. It is intended, of course, that when the second clock pulse will arrive at time $T_3$, flip-flop 11 should reset. Now, if after $T_1$ the ONE signal from F-F 11 is channeled to and through the logic network 13 fast enough, then the logic network 13 may provide a reset order to line 21 while the first clock pulse (i.e., before time $T_2$) is still on line 22. Consequently, in fast digital computers, the logic network 13 may direct flip-flop 11 to assume complementary states during the time duration of a single clock pulse.

A major undesirable effect caused by this condition is that flip-flop 11 (or other flip-flops in networks 13 and 15) may switch so rapidly that the logical decisions, which are to be performed during the second clock period, are actually performed during the first clock period.

One of the frequently used techniques employed to remedy this undesirable condition makes use of a time delay supplied by a suitable delay network inserted in the path between the flip-flop's output and input such that a minimum period of time must elapse for flip-flop 11 to change from one logical state to the other.

Figure 3:
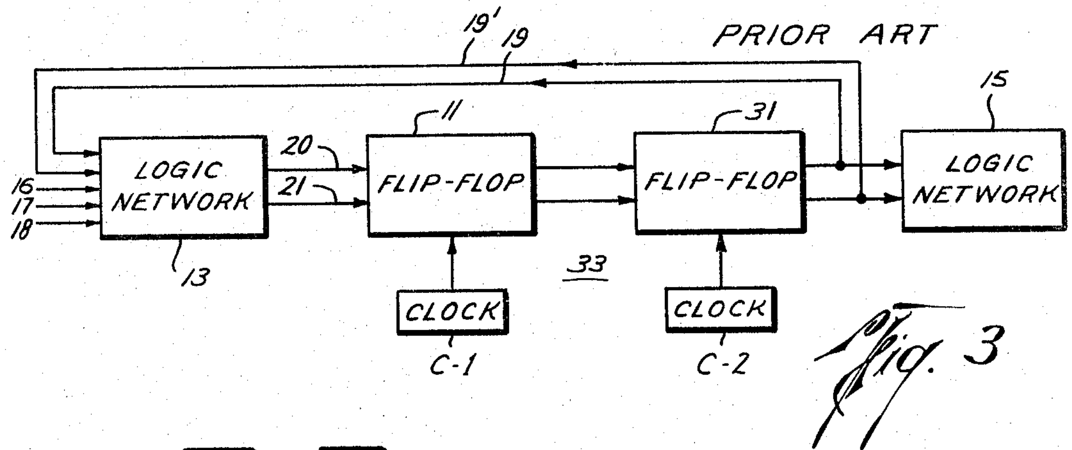
FIG. 3 shows a prior art two-phase system synchronized with two clock signals.
Figure 4:
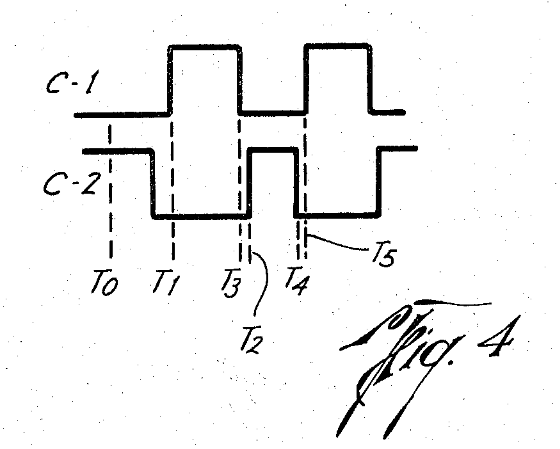
FIG. 4 shows typical clock signal wave forms used in the system of FIG. 3.

A second approach to the elimination of the logical race condition uses the so-called "two-phase" system schematically represented in FIG. 3. A distinctive characteristic of the two-phase system is that an additional bit storage element, such as a second F-F 31, follows each normal flip-flop 11. Both flip-flops 11 and 31 form a "two-phase" flip-flop shown enclosed within a dotted box, generally designated as 33. To synchronize this system, two distinct clock signals from clocks C–1 and C–2 are employed, both clock signals having the same rate and being displaced by a predetermined time interval *dt,* as shown in FIG. 4. Because in all other respects the system of FIG. 2 is analogous to that of FIG. 1, similar parts are denoted with the same numerals.

Figures 5, 6:
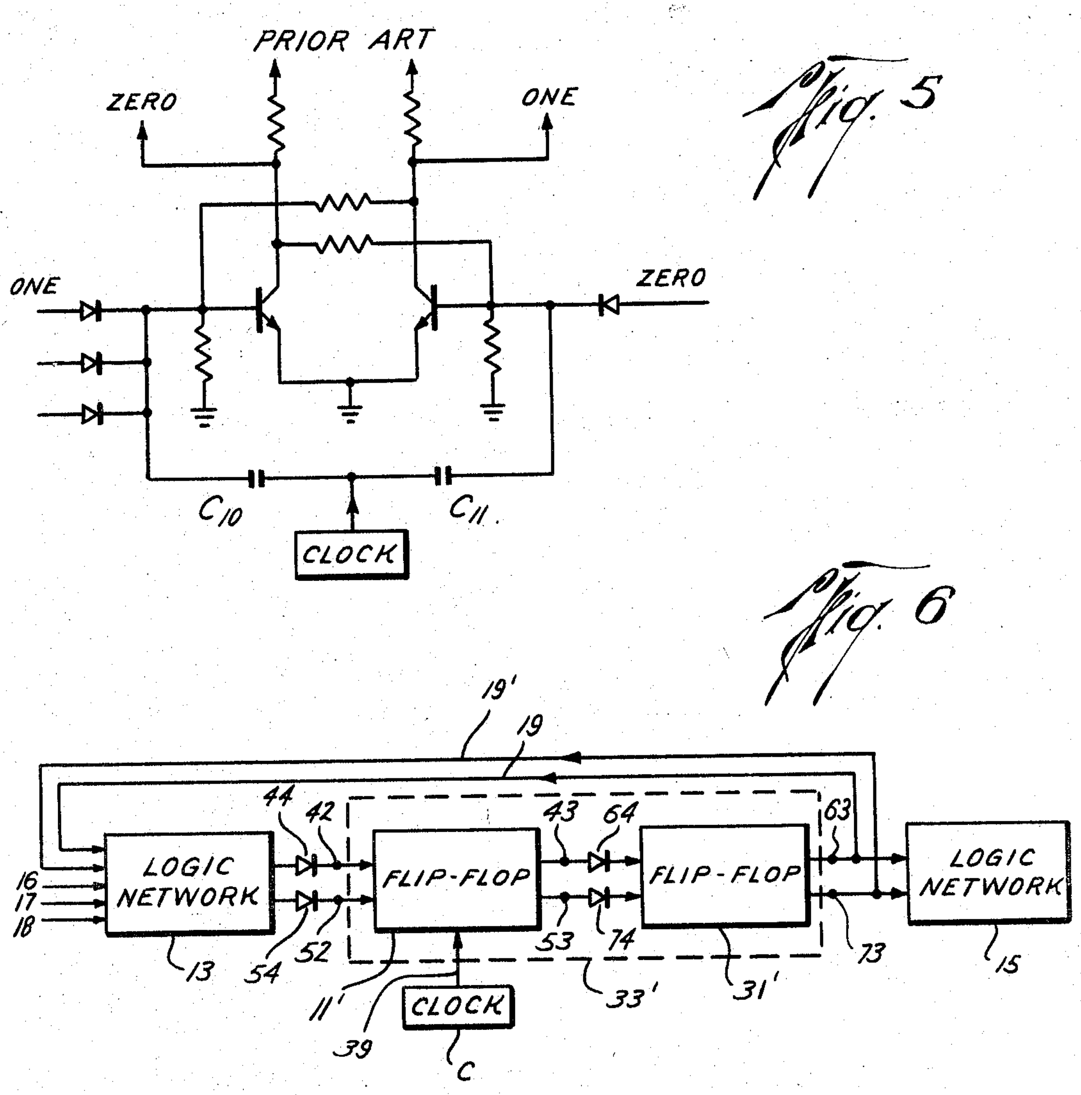
FIG. 5 shows a typical prior art logic flip-flop.
FIG. 6 shows a two-phase system, in accordance with the invention, driven by a single clock signal.

In operation of the two-phase system, assume that the logic network 13 provides a set order on line 20 at some arbitrary time $T_0$. Then flip-flop 11 will assume a ONE state upon receipt of a C–1 pulse at time $T_1$. The second F-F 31 will respond to the ONE output from F-F 11 upon receipt of a C–2 pulse at $T_2$. Assume again that the circuitry is such that the ONE signal from F-F 31 propagates very fast through the logic network 13 thereby causing line 21 to receive substantially simultaneously a reset order. Now, however, the first F-F 11 cannot change states until it receives a second C–1 clock pulse at time $T_5$ since the first clock pulse is not preset at the time of the logic change. Consequently, it will be apparent that the logical race condition is remedied. The main disadvantage of the two-clock-two-phase system, however, is that it requires a large number of components. Another disadvantage of the system of FIG. 3, as well as that of FIG. 1, will become apparent upon an inspection of a typical prior art, bistable flip-flop, as shown in FIG. 5, from which it can be seen that the clock signals are coupled to the respective halves of the flip-flop through two coupling capacitors $C_{10}$ and $C_{11}$. The A.C. coupling of the clock results in short time constants at high frequencies requiring that increased power be delivered from the logic to the flip-flop. The A.C. coupling also provides low impedance paths for noise components of the clock waveform.

In accordance with this invention, the need for two distinct clock signals, such as are required in the system of FIG. 3, is obviated and the need for the A.C. coupling capacitors $C_{10}$, $C_{11}$ is eliminated.

Figure 7:
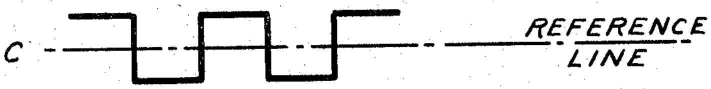
FIG. 7 is a clock signal wave form which may be used to synchronize the operations in the system of FIG. 6.

The invention will be first generally described in conjunction with FIG. 6. In FIG. 6 the two-phase F-F is designated as 33′. It includes flip-flops 11′ and 31′. Flip-flop 33′ is synchronized by only one clock pulse signal supplied by clock source C to F-F 11′. The clock signal wave is represented in FIG. 7 as a rectangular wave; however, several other wave shapes may be employed—triangular, trapezoidal, sinusoidal, etc., the only requirement being that during each clock pulse period, the clock signal must go both positive and negative with respect to the "reference level" of the second flip-flop 31′, as will become more apparent upon the description of an illustrative embodiment of the two-phase flip-flop 33′.

In each of FIGS. 8–12 each of the bistable flip-flops within the two-phase flip-flop 33 is represented as a bistable device, i.e., if one-half thereof is ON, the other half is OFF and vice versa. Each half of each flip-flop typically has three terminals. The two halves 40 and 50 of F-F 11′ have terminals 41–43 and 51–53, respectively. The two halves 60 and 70 of F-F 31′ have terminals 61–63 and 71–73, respectively. Terminals 41 and 51 of flip-flop 11′ are connected to the clock receiving line 39. To terminals 42, 52 are applied the command set and reset signals from the logic network 13 (not shown). These command signals are applied through unidirectional coupling devices 44, 54, poled as shown. The decision of flip-flop 11 may be read out from its output terminals 43, 53. These decisions are applied to the input terminals 62, 72 of F-F 31′ via unidirectional conducting devices 64, 74, respectively, as shown. The "reference" terminals 61, 71 are tied together to a fixed reference level which may be ground, as shown. The decisions of F-F 31′ are read out from terminals 63, 73, connected to lines 19, 19′ respectively. During each clock period the clock signal C goes positive and negative with respect to the reference level applied to terminals 61, 71.

Figure 8:
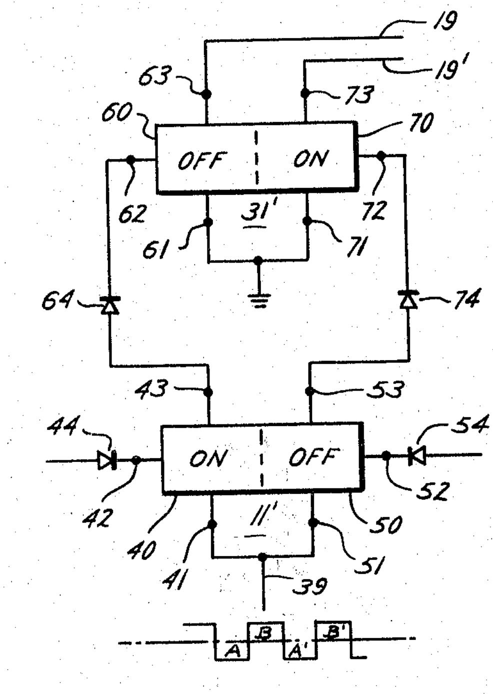
FIGS. 8–12 illustrate the operation of the two-phase flip-flop used in FIG. 6.
Figure 9:
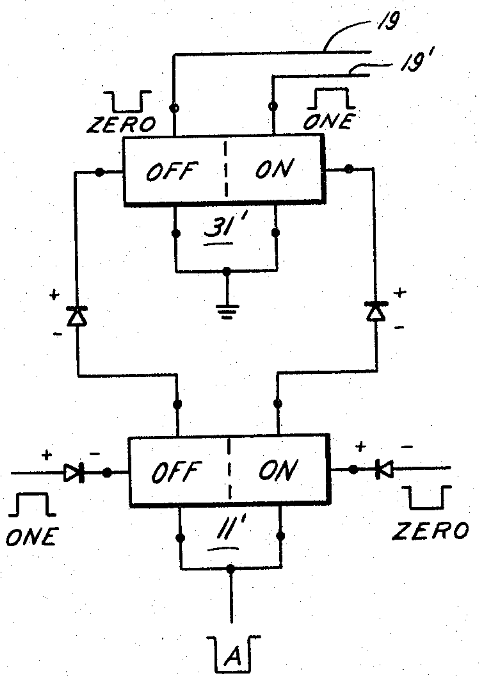

Assume, as shown in FIG. 8, that sections 40 and 70 of the two-phase F-F 33′ are ON and sections 50 and 60 are OFF. Let a set logic voltage level be applied to diode 44, as shown in FIG. 9. Shortly after the clock goes negative and during the first half A of the first clock period, section 40 turns OFF and section 50 ON.

When a ONE signal is applied to diode 44, it is required that a ZERO signal be applied to diode 54 since the flip-flop cannot be told to both set and reset at the same time. This insures adequate back-bias on diode 54 thereby maintaining section 50 ON. During this condition, as will be apparent subsequently, diodes 64 and 74 are back-biased. Hence, the change of state of F-F 11′ does not affect the condition of flip-flop 31. When sections 60 and 70 are respectively OFF and ON, as shown in FIG. 9, output terminals 63, 73 respectively provide to lines 19, 19′ ZERO and ONE signals.

Figure 10:
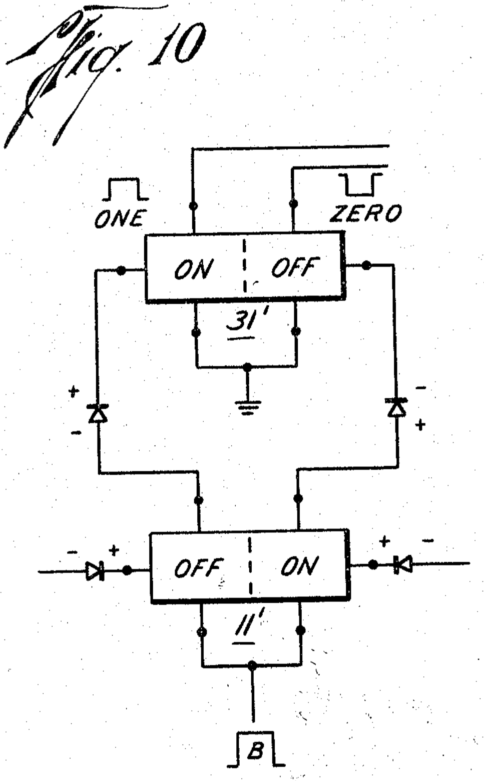

During the next half cycle B of the clock period, the clock signal goes from negative to positive causing diode 74 to become forward-biased thereby initiating the switching of states between sections 60 and 70. Section 70 turns OFF and section 60 ON, as shown in FIG. 10.

In sum, during the negative portion of a single clock cycle, the second flip-flop 31′ is not responsive to a set or reset order supplied to control terminal 42 or 52. But during the positive portion of the clock cycle, the information stored in the first flip-flop 11′ is transferred to the second flip-flop 31′ at which time the first flip-flop is not responsive to set or reset orders supplied to terminal 42 or 52. The two-phase flip-flop 33′, as shown in FIG. 10, is in the set condition.

Figures 11, 12, 13:
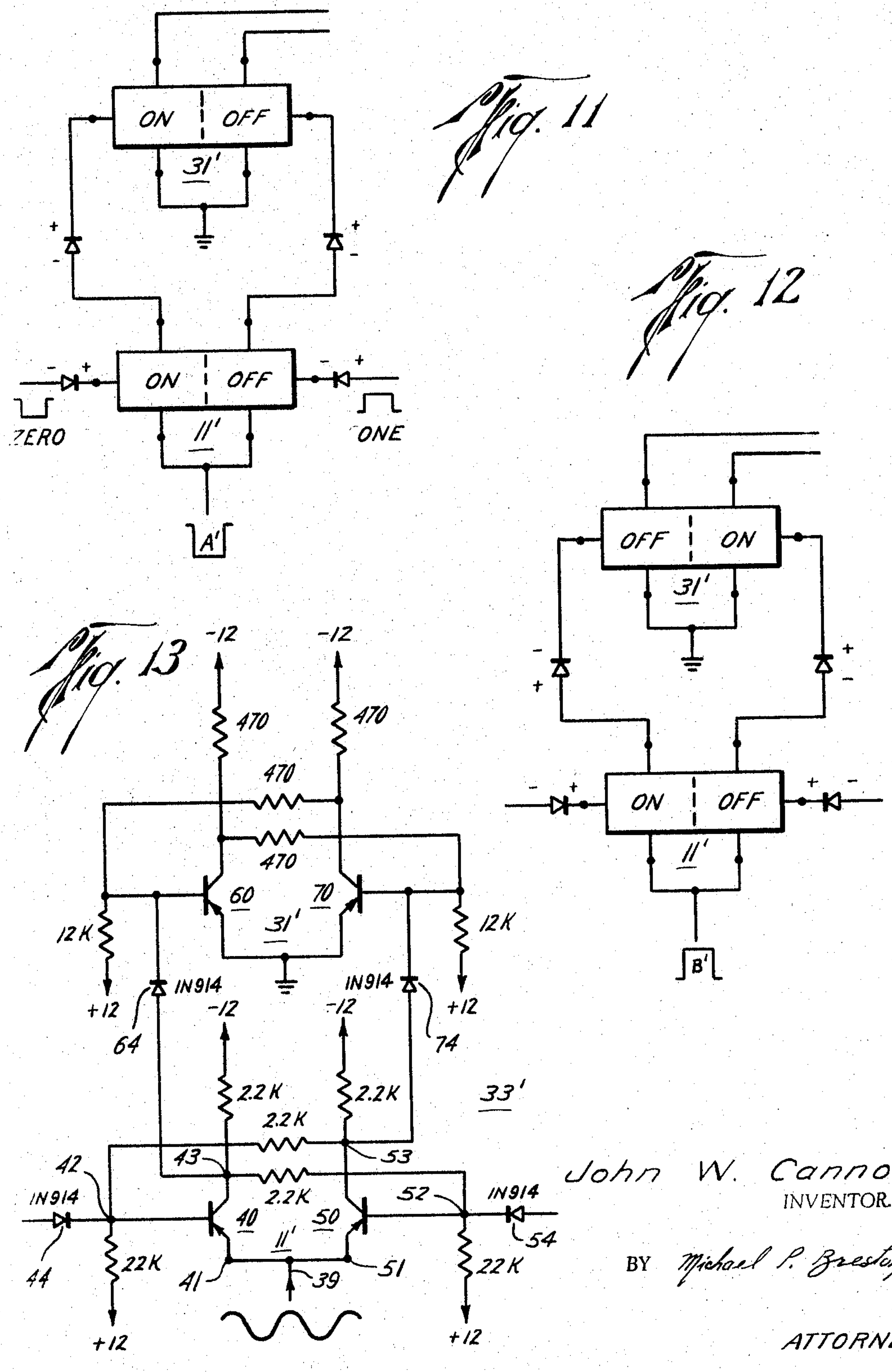
FIG. 13 is a preferred embodiment of a two-phase flip-flop which may be used in the system of FIG. 6.

To reset the two-phase flip-flop 33′, a ONE signal is applied to control terminal 52. During the next negative portion A′ of the clock signal, the ONE signal forward-biases diode 54 and the ZERO signal reverse-biases diode 44. As a result, section 50 turns OFF and section 40 ON, as shown in FIG. 11′. For reasons previously stated, during a negative portion of a clock cycle, diodes 64, 74 are back-biased and, hence, the state of flip-flop 31′ does not change. Then when the next positive portion B′ of the clock signal arrives, diode 64 becomes forward-biased turning OFF section 60 and turning ON section 70, as shown in FIG. 12.

In sum, in the two-phase flip-flop 33′ of the present invention the logic directive signals are coupled into the first flip-flop 11′ via normal "logic" diodes 44, 54; whereas the complementary output decisions (ONE and ZERO signals) of flip-flop 11′ are coupled to the second flip-flop 31′ via unidirectional conducting devices 64, 74.

It will be appreciated that by applying an alternating signal to the reference terminals 41, 51 of the first flip-flop 11′, a reference shift is achieved between the first flip-flop 11′ and the second flip-flop 31′. When the reference level applied to terminals 41, 51 of sections 40 and 50 falls below the reference level of terminals 61, 71 of sections 60 and 70, F-F 11′ will switch conduction states in response to a set or reset order while the state of F-F 31′ will remain unchanged. On the other hand, when the reference potential applied to terminals 41, 51 of sections 40 and 50 is above the reference level of terminals 61, 71 of sections 60 and 70, flip-flop 11′ will not switch conduction states in response to the set or reset logic signals while flip-flop 31′ will switch conduction states in response to an output from F-F 11′. The output logic, complementary signals of F-F 31′ are applied to lines 19, 19′ in a manner previously explained. Hence with the system of the present invention, no signals can reach lines 19, 19′ in response to logic signals applied to F-F 11′ during the first or negative portion of each clock cycle or period. As a result, the desired delay and the avoidance of the logic race problem are both automatically achieved.

In FIG. 13 is illustrated a preferred embodiment of the two-phase flip-flop 33′, schematically represented in FIGS. 8–12. To better bring out the analogy between the schematic representations shown in FIGS. 8–12 and FIG. 13, the same numerals are used to designate similar parts. The values of the components in flip-flops 11′, 31′ are given for illustration only. It will be noted that the resistance values of flip-flop 11′ are relatively higher than those of flip-flop 31′. The emitter electrodes of sections 60 and 70 are tied to ground which is taken as the reference voltage level. It should be understood that rather than ground, another fixed voltage level may have been equally chosen. The clock signal is applied to the emitters of sections 40 and 50. This clock signal in the preferred mode of operation of the two-phase flip-flop 33′ is a sine wave, rather than a square wave, periodically alternating above and below the reference level (ground) of flip-flop 31′. Inasmuch as the operation of the two-phase flip-flop 33′ was generally described in conjunction with FIGS. 8–12, it is not believed that a more detailed description of the operation of the embodiment shown in FIG. 13 is necessary.

It will be appreciated by men skilled in the art that, in accordance with this invention, a significant power gain is achieved. The inherent power gain of a flip-flop, such as flip-flop 11′, is utilized without power loss (as would be incurred in a conventional two-phase system such as shown in FIG. 3) to drive a high-power, low-impedance flip-flop, such as flip-flop 31′. Consequently, the output power level of the logic network, such as 13 (see FIG. 6), applied to a flip-flop is given a "double boost" before the decisions are presented on the output lines 19 and 19′ either to the logic network 13 or to the logic network 15.

Having thus described my invention with particular reference to preferred forms thereof, it will be obvious to those skilled in the art to which the invention pertains, after understanding my invention, that various changes and other modifications may be made therein without departing from the spirit and scope of my invention, as defined by the claims appended hereto.

What is claimed is:

1. In a digital computer at least one logic block,
said logic block including at least a first bistable device and a second bistable device,
means coupling the output signals of said first bistable device to said second bistable device,
a fixed reference voltage level in said second bistable device,
means coupling directive SET and RESET signals to said first bistable device,
means coupling a clock signal to said first bistable device, said clock signal alternating about said fixed reference level whereby said first bistable device becomes responsive to one of said directive signals only when said clock signal falls below said fixed reference level, and
said second bistable device becomes responsive to one of said output signals from said first bistable device only when said clock signal exceeds said fixed reference level.

2. In a digital computer at least one logic block,
said logic block including at least a first bistable device and a second bistable device,
unidirectionally conducting elements coupling the output signals of said first bistable device to the input terminals of said second bistable device,
a fixed reference voltage level in said second bistable device,
said output signals of said first bistable device being compared relative to said fixed reference level,
unidirectionally conducting elements coupling directive signals to said first bistable device,
said first bistable device having a reference level which is made to alternate about said fixed reference level, whereby said first device becomes responsive to one of said directive signals only when said reference level of said first device falls below said fixed reference level, and said second bistable device becomes responsive to one of said output signals from said first bistable device only when the reference level of said first bistable device exceeds said fixed reference level in said second bistable device.

3. In a digital computer at least one logic block, said logic block including a first flip-flop and a second flip-flop, unidirectionally conducting elements coupling the output signals of said first flip-flop to the input terminals of said second flip-flop, a fixed reference voltage level in said second flip-flop, means coupling directive SET and RESET signals to said first flip-flop, means coupling to said first flip-flop a clock signal alternating about said fixed reference level whereby said first flip-flop becomes responsive to one of said directive signals only when said clock signal falls below said fixed reference level, and said second flip-flip becomes responsive to one of said output signals from said first flip-flop only when said clock signal exceeds said fixed reference voltage level.

4. The digital computer of claim 3 and further including a clock signal generator for providing a sinusoidal clock signal to said first flip-flop, and wherein said means for coupling directive SET and RESET signals are logic diodes.

5. The digital computer of claim 3 and further including a logic network for providing said SET and RESET signals to said first flip-flop, and means for coupling the output signals of said second flip-flop to said logic network.

6. In a digital computer at least one logic block, said logic block including a first flip-flop and a second flip-flop, said first flip-flop including a first transistor and a second transistor, said second flip-flop including a third transistor and a fourth transistor, each transistor having a base, emitter, and collector electrodes, means coupling the collector of said first transistor to the base of said second transistor, means coupling the collector electrode of said second transistor to the base of said first transistor, means coupling the collector of said third transistor to the base of said fourth transistor, means coupling the collector of said fourth transistor to the base of said third transistor, means connecting the emitter electrodes of said third and fourth transistors to a fixed reference voltage level, unidirectionally conducting means coupling the collector of said first transistor to the base of said third transistor, unidirectionally conducting means coupling the collector of said second transistor to the base of said fourth transistor, means coupling the emitter electrodes of said first and second transistors to a clock source, said clock source providing a signal alternating about said reference voltage level, means coupling directive SET and RESET signals to the base electrodes of said first flip-flop whereby said first flip-flop becomes responsive to one of said directive signals only when said clock signal falls below said fixed reference level, and said second flip-flop becomes responsive to one of the output signals from said first flip-flop only when said clock signal rises above said fixed reference voltage level.

7. In a computer a first logic network, a second logic network, said second logic network including a first bistable device and a second bistable device, a reference voltage level in said second bistable device, means coupling the output signals of said first bistable device to said second bistable device, a single clock source providing a clock signal for synchronizing the operation of said computer, means coupling said source to said first bistable device, said source providing a signal alternating about said fixed reference voltage level, means coupling directive SET and RESET signals from said first logic network to said first bistable device whereby said first bistable device becomes responsive to one of said directive signals when said clock signal falls below said fixed reference voltage level, and whereby said second bistable device becomes responsive to one of said output signals from said first bistable device when said clock signal exceeds said fixed reference voltage level, and means coupling the output signals of said second bistable device to said first logic network.

8. The computer of claim 7 wherein said clock source generator is a sinusoidal signal generator.

9. The computer of claim 7 wherein said means for coupling the output signals of said first bistable device to said second bistable device are unidirectionally conducting elements.

10. The computer of claim 9 wherein said first and second bistable devices are flip-flops.

References Cited by the Examiner

UNITED STATES PATENTS 3,247,399 4/1966 Moody ------------- 328—206

ARTHUR GAUSS, *Primary Examiner.*

J. BUSCH, *Assistant Examiner.*